Patented Sept. 4, 1928.

1,682,920

UNITED STATES PATENT OFFICE.

ALEXANDER T. MAXIMOFF, OF NEW YORK, N. Y., ASSIGNOR TO THE NAUGATUCK CHEMICAL COMPANY, OF NAUGATUCK, CONNECTICUT, A CORPORATION OF CONNECTICUT.

MANUFACTURE OF THIURAM MONOSULPHIDES.

No Drawing.   Application filed September 18, 1926.   Serial No. 136,387.

The method ordinarily employed for the preparation of thiuram monosulphides involves treating the corresponding thiuram disulphide with potassium cyanide in an aqueous alcoholic solution. The present invention has for its object a method which is considerably less expensive, highly productive and which does not require the use of alcohol.

With a specific embodiment in mind, but without intention to limit the invention, beyond what may be required by the prior art, the invention comprises treating a thiuram disulphide with an aqueous solution of a metallic cyanide in order to form the corresponding thiuram monosulphide and recovering the monosulphide from the reaction mixture.

As an example of the process, 200 lbs. of wet tetramethyl thiuram disulphide are thoroughly mixed with 400 lbs. of water in which it is insoluble. To this suspension is then added a solution of 70 lbs. of sodium cyanide in 200 lbs. of water. The cyanide solution is added slowly, and with vigorous stirring, so that the temperature does not rise too rapidly. After all of the cyanide solution has been added, the stirring is continued for about an hour longer. At this time the reaction mixture may be sampled and tested for the presence of unchanged thiuram disulphide. If any of this compound is present, the stirring is continued for a while longer or an additional amount of the cyanide solution may be added. The reaction mixture is allowed to stand until all of the disulphide has been converted into monosulphide, whereupon the latter is filtered out and thoroughly washed with water until free from cyanides and thiocyanates. The solid material is then removed, dried at 120°–130° F., ground and screened. The yield of monosulphide is approximately 90% of the theoretical yield.

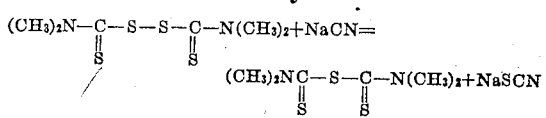

The above described method is not limited to the production of tetramethyl thiuram monosulphide but may be employed in the preparation of other aryl or alkyl thiuram monosulphides, such as tetra ethyl thiuram monosulphide, and the mixed thiuram monosulphides, as for example dimethyl diphenyl thiuram monosulphide, and other aryl-alkyl thiuram monosulphides.

It will thus be seen that the invention permits the easy manufacture of thiuram monosulphides without the presence of any alcohol and the invention gives an exceptionally high yield of the desired product.

The claims are to be understood as including the aryl or alkyl or aryl-alkyl compounds. Other water soluble cyanides such as potassium cyanide, calcium cyanide, etc., may be used in the above reaction.

Having thus described my invention, what I claim and desire to protect by Letters Patent is:

1. The method of preparing thiuram monosulphides from the corresponding thiuram disulphides which comprises treating the thiuram disulphide while in suspension in a non-solvent with a metallic cyanide in aqueous solution.

2. The method of preparing thiuram monosulphides from the corresponding thiuram disulphides which comprises treating the thiuram disulphide while in suspension in water with an aqueous solution of a metallic cyanide.

3. The method of preparing thiuram monosulphides from the corresponding thiuram disulphides which comprises treating the thiuram disulphide while in suspension in water with an aqueous solution of an alkali cyanide and repeatedly stirring until the reaction is substantially complete.

4. The method of preparing tetramethyl thiuram monosulphide from the corresponding thiuram disulphide which comprises mixing the disulphide with water, adding an aqueous solution of an alkali cyanide, repeatedly stirring until the reaction is complete, and recovering the tetramethyl thiuram monosulphide.

Signed at New York, New York, this 16th day of September, 1926.

ALEXANDER T. MAXIMOFF.